United States Patent [19]

Havenhill

[11] Patent Number: 5,386,738

[45] Date of Patent: Feb. 7, 1995

[54] DIRECT TORQUE CONTROL MOMENT GYROSCOPE

[75] Inventor: Douglas D. Havenhill, Peoria, Ariz.

[73] Assignee: Honeywell Inc., Minneapolis, Minn.

[21] Appl. No.: 995,477

[22] Filed: Dec. 22, 1992

[51] Int. Cl.[6] ............................................. G01C 19/24
[52] U.S. Cl. ........................................ 74/5.22; 74/5.46
[58] Field of Search ......................... 74/5.22, 5.46, 5.4

[56] References Cited

U.S. PATENT DOCUMENTS

| | | | |
|---|---|---|---|
| 3,082,631 | 3/1963 | Bishop | 74/5.4 X |
| 3,107,540 | 10/1963 | Curriston | 74/5.4 |
| 3,276,273 | 10/1966 | Baker | 74/5.4 X |
| 3,608,384 | 9/1971 | Hardin | 74/5.22 |
| 3,742,769 | 7/1973 | Crutcher et al. | 74/5 R |
| 3,762,226 | 10/1973 | Davis et al. | 74/5.4 |
| 4,242,917 | 1/1981 | Bennett et al. | 74/5.5 |
| 4,285,552 | 8/1981 | Sutter | 74/5.46 X |
| 4,375,878 | 3/1983 | Harvey et al. | 74/5.22 X |
| 4,642,501 | 2/1987 | Kral et al. | 310/90.5 |
| 4,961,352 | 10/1990 | Downer et al. | 74/5.46 |

Primary Examiner—Rodney H. Bonck
Attorney, Agent, or Firm—Kenneth J. Johnson

[57] ABSTRACT

A control moment gyroscope for providing directional control in a spacecraft. The control moment gyroscope has a rotor which is electrostatically or magnetically supported within a gimbal housing so as not to touch any of the interior surfaces of the housing. The housing is mounted on a gimbal support which in turn is mounted on the spacecraft. Connected to the gimbal housing is a torque motor which rotates the housing around a gimbal axis. In order to induce a direction changing torque on the spacecraft, the rotor is first spun about its rotor axis. A torque is then induced on the rotor about the output axis. This induced torque will cause the rotor to precess about the gimbal axis which the torque motor follow. The torque induced around the output axis is transferred directly to the spacecraft.

20 Claims, 6 Drawing Sheets

5,386,738

DIRECT TORQUE CONTROL MOMENT GYROSCOPE

FIELD OF THE INVENTION

This invention relates to control moment gyroscopes and more specifically to the reduction of torque ripple during the operation of a control moment gyroscope.

BACKGROUND OF THE INVENTION

Control moment gyroscopes are well known means of providing directional control for a variety of vehicles, most notably spacecraft. Control moment gyroscopes normally comprise a rotor, a motor to spin the rotor about a rotor axis, a gimbal, a gimbal torque motor to rotate the gimbal about a gimbal axis, and a control system. The control moment gyroscope is mounted within the spacecraft along the axis in which it will in induce a torque. The rotor is mechanically supported in the gimbal and is rotated about the gimbal axis which is normal to the rotor axis.

During operation of the gyroscope, the rotor is spun by a motor about its rotor axis at a predetermined rate. In order to induce a torque on the spacecraft, the gimbal torque motor rotates the gimbal and spinning rotor about the gimbal axis. The rotor is of sufficient mass and is spinning at such a rate that any movement of the rotor out of its plane of rotation will induce a significant torque around an output axis which is both normal to both the rotor axis and the gimbal axis. Torque around the output axis is transferred directly to the spacecraft.

One requirement of a control moment gyroscope is that the torque to the spacecraft be delivered in as smooth a fashion as possible. In the prior art gyroscopes, anomalous torques can be caused by rate variations in the rotation of the gimbal. These anomalous torques, or ripple torques, can become significant in light of the fact that they are directly proportional to the angular momentum of the rotor. So the greater the mass and rate of rotation of the rotor, the greater the ripple torques can be.

The ripple torques are caused from a variety of sources. They may include gimbal rate sensor (tachometer) errors, motor ripple torque, motor cogging torque, motor gear train imperfections, electronic drive amplifier biases, electronic drive amplifier gain variations, motor commutation offsets, motor commutation gain variations, and gimbal bearing noise. The common thread running through all these potential problem sources is that they are all related to the operation of the gimbal torque motor.

Thus, there is need for a control moment gyroscope that delivers torque to the spacecraft in a smooth fashion and substantially eliminates ripple torques.

SUMMARY OF THE INVENTION

There is provided a direct torque control moment gyroscope. A rotor is supported within a gimbal housing and a motor is provided to rotate the rotor about a rotor axis at a predetermined rate. The gimbal housing is located in a gimbal support structure and is allowed to rotate about a gimbal axis which is normal to the rotor axis. A gimbal torque motor located on the gimbal support structure rotates the gimbal housing and rotor about the gimbal axis. The gimbal support structure transfers torque from the gyroscope to the spacecraft.

The gyroscope has three reference axes; the gimbal axis, the axis of rotation for the rotor, and the output axis. In order to induce a torque on the spacecraft, force actuators induce a torque on the spinning rotor about the output axis. This induced torque causes the rotor to precess about the gimbal axis. The gimbal torque motor rotates the gimbal housing so as to follow the precession of the rotor and avoid a touchdown of the rotor in the gimbal housing. As the gimbal housing and rotor rotate about the gimbal axis, a torque is applied to the spacecraft around the output axis. Because the output torque is provided by a force actuator instead of a gimbal rate provided by torque motor and rate control elements, torque ripple is substantially eliminated.

DETAILED DESCRIPTION OF THE DRAWINGS

FIG. 1 schematic diagram of the Direct Torque Control Moment Gyroscope.

PREFERRED EMBODIMENT OF THE INVENTION

Figure 1:
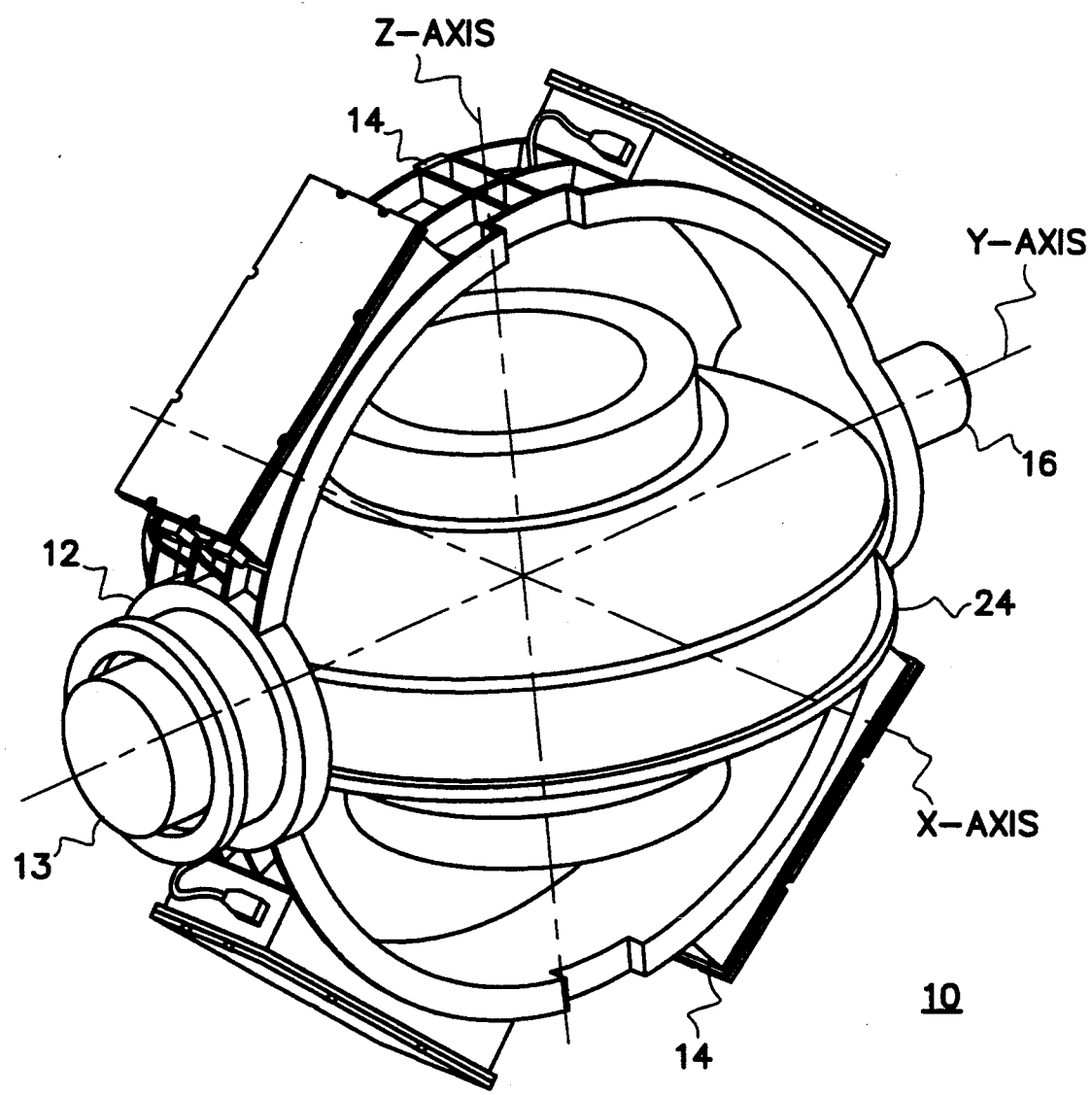

Referring to FIG. 1, there is shown a Direct Torque Control Moment Gyroscope. The control moment gyroscope assembly 10 includes a torque motor 12 and tachometer 13. Directly attached to the torque motor 12 is the gimbal housing 24. Attached to the gimbal housing opposite the torque motor is the sensor module assembly 16. Extending from the torque motor 12 to the sensor module assembly 16, both below and above the gimbal housing 24, is the gimbal housing support frame 14. The gimbal housing 24 is installed in the support frame 14 so that it can rotate about the gimbal axis. The torque motor 12 is positioned on the support frame 14 so that it may induce a torque on the gimbal housing around the gimbal axis.

Figure 2:
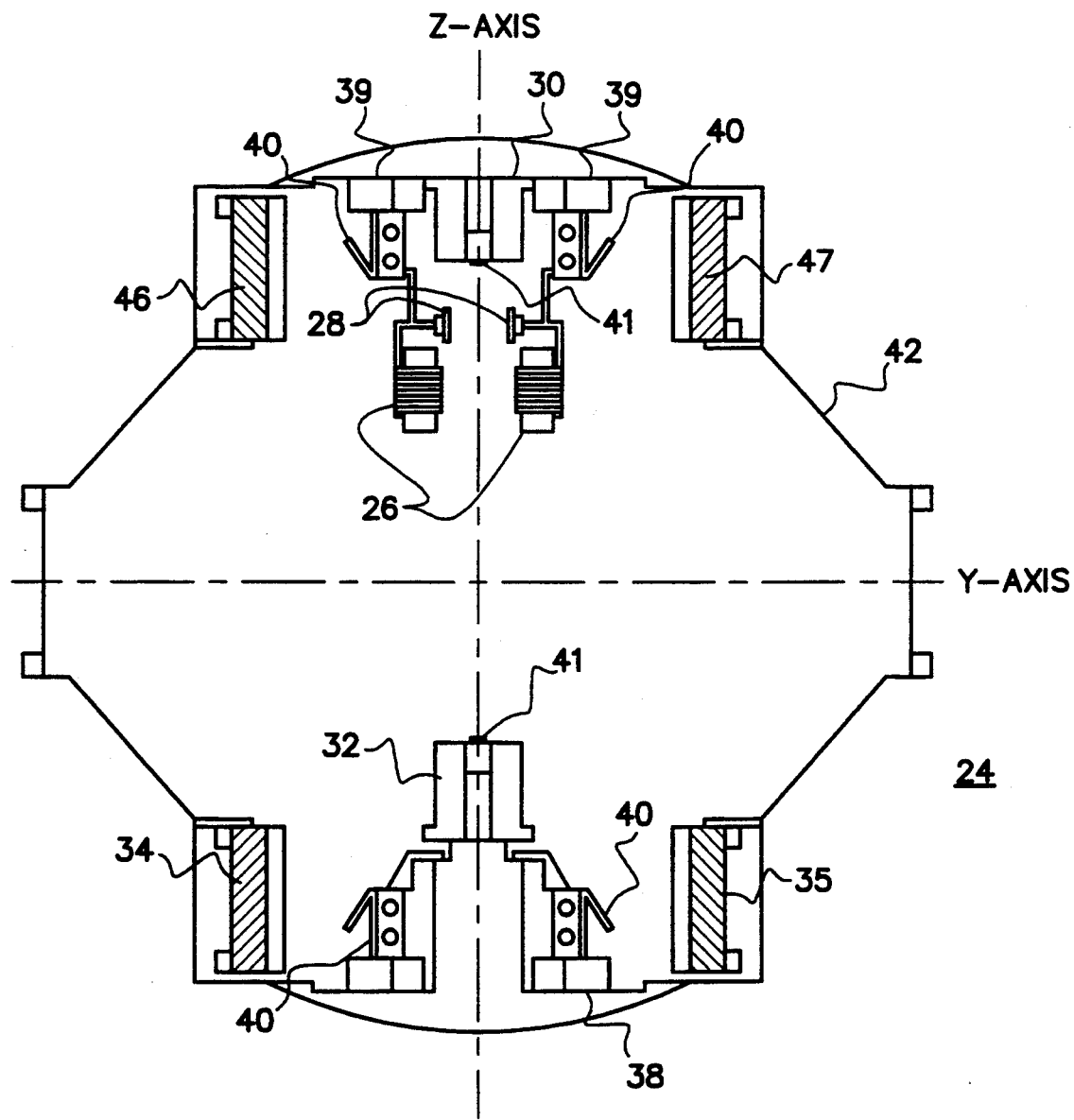
FIG. 2 is a cross section of the gimbal housing.
Figure 3:
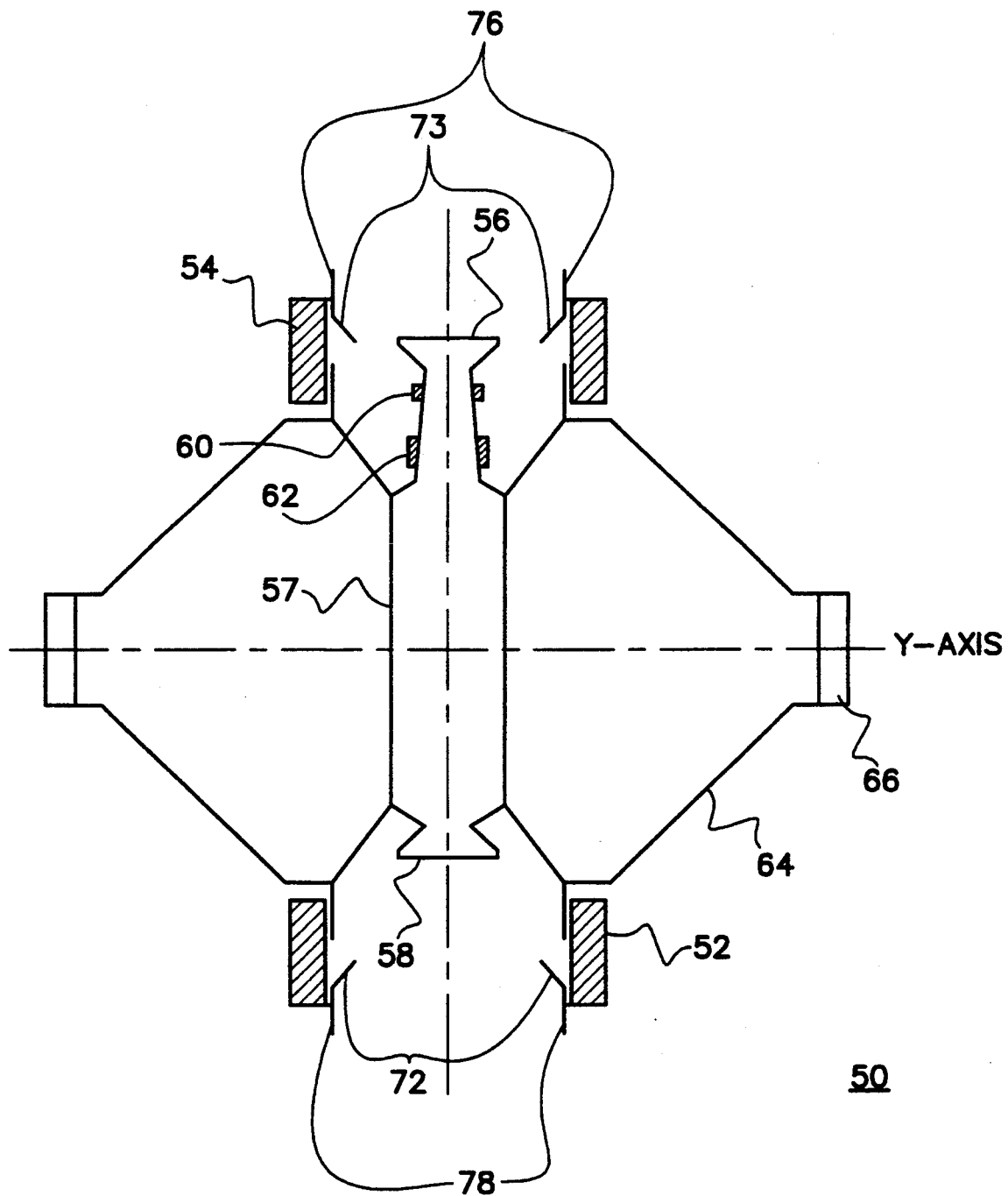
FIG. 3 is a cross section of the rotor assembly.

FIG. 2 shows a cross section of the gimbal housing 24, while FIG. 3 shows a cross section of the rotor assembly 50. In an assembled direct torque control moment gyroscope, the rotor assembly 50 is contained within the gimbal housing 24. In FIG. 2, the components of the gimbal housing 24 are enclosed by a shell 42 which attaches to the torque motor 12 and the sensor module assembly 16. Located at the top and bottom of the shell are the translational actuators 30 and 32. The translational actuators create a magnetic field which acts to provide single axis support for an object made of magnetic material located in the field. In this case, the magnetic field is applied along the rotor axis.

Located at the bottom of the shell 42 are lower magnetic actuators 34 and 35, while at the top of the shell are upper magnetic actuators 46 and 47. Also mounted near the top of the shell are motor stator 26 and resolver stator 28. The two stators are components of the DC brushless motor which induce a spin on the gyroscope rotor assembly 50 about the rotor axis.

Mounted at the top and bottom of the shell 42 are touchdown surfaces 40 and 41, respectively. These touchdown surfaces support the gimbal housing when it is not being magnetically levitated between magnetic actuators 30 and 32. Also located at the bottom and top of the shell 42 are the gap sensors 38 and 39 which are used in detecting movement of the rotor assembly in the output axis and the gimbal axis direction within the gimbal housing.

FIG. 3 shows the rotor assembly 50. The rotor shell 64 supports all the components of the rotor assembly 50. The rotor rim 66 encircles the rotor shell 64 and supplies the majority of mass for the assembly. The rim is of sufficient size and density so as to provide sufficient momentum for making a directional change of a spacecraft while the rotor is spinning at a predetermined rate. Also attached to the rotor shell is the rotor shaft 57. Armature 52 and 54, motor rotor 62, and resolver rotor 60 are all made of a magnetic material and encircle the rotor shaft 57. The upper and lower translational magnetic armatures, 56 and 58 respectively, are mounted at opposite ends of the rotor shaft and are also constructed of a magnetic material. The rotor assembly further includes the touchdown surfaces 72 and 74, as well as gap sensor surfaces 76 and 78.

Figure 4:
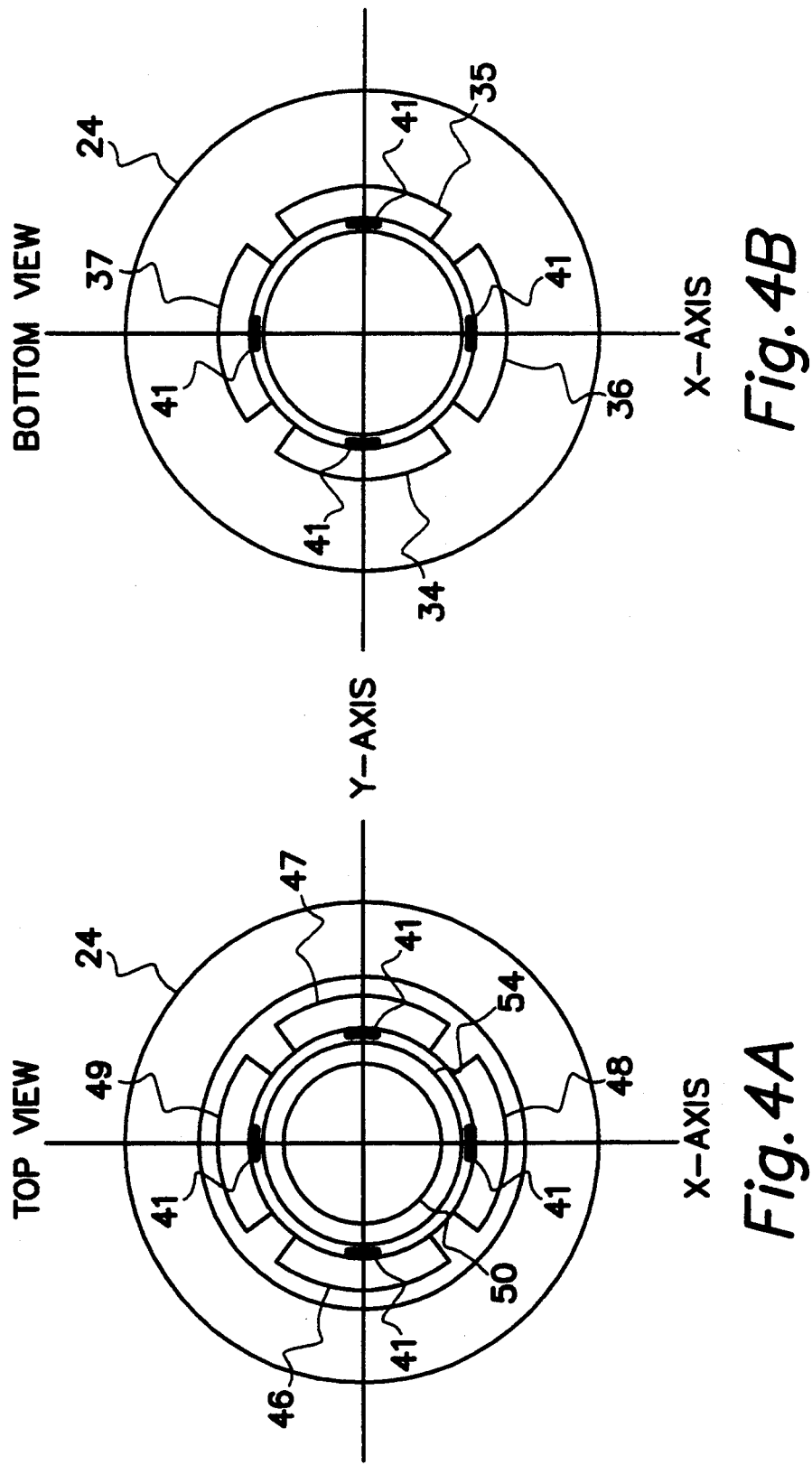
FIG. 4a is top view of the gimbal housing and FIG. 4b is a bottom view of the gimbal housing.

FIGS. 4a and 4b are perspective views showing the arrangement of the magnetic actuators within gimbal housing 24. In FIG. 4a it can be seen that the magnetic actuators 46, 47, 48, and 49 form a ring around the upper armature 54. Magnetic actuators 46 and 47 will form a magnetic field parallel to the gimbal axis, while magnetic actuators 48 and 49 will form a magnetic field parallel to the output axis. In FIG. 4b, magnetic actuators 34, 35, 36, and 37 form a ring around the lower armature 52. Actuators 34 and 35 form a magnetic field parallel to the gimbal axis, while actuators 36 and 37 form a magnetic field parallel to the output axis.

When the gyroscope is assembled, the upper armature 54 is aligned to rotate within the circle created by the upper magnetic actuators 46–49. The lower magnetic armature 52 is aligned to rotate within circle created by the lower magnetic actuators 34, 35, 36, and 37. The motor rotor 62 is aligned with the motor stator 26, and the resolver rotor 60 is aligned with the resolver stator 26. The translational magnetic armatures 56 and 68 are aligned with the translational actuators 30 and 32 respectively.

The operation of the upper, lower and translational magnetic actuators can be better understood by study of U.S. Pat. Nos. 4,642,501 (Kral et al). Kral et al discloses an apparatus for applying a electromagnetic force which is proportional to an input command. The electromagnetic force is applied in a single direction and the body or armature upon which the force is applied is free to move in directions which are normal to the direction of the force. Each apparatus is comprised of two stator pieces, an armature, and a flux sensor on one pole face of each stator. Each stator has two identical coils which are wound around a magnetic core and connected in series. The stators are set opposite one another and the armature is positioned between the stators.

When the coils in each stator are energized, two electromagnetic fields are created which exert opposing forces on the armature. If the fields are of equal strength and the stators are equidistant from the armature, then the armature will be suspended along the axis the electromagnetic force is exerted. The force exerted on the armature can be monitored and controlled through the use of the flux sensors which measure the strength of the magnetic field surrounding the stators, and transmit this information to the control electronics. The force exerted on the armature is directly proportional to the magnetic field strength.

In the gyroscope assembly 10, The upper and lower translational actuators, 30 and 32, create a magnetic field which suspends the rotor assembly along the rotor axis so that the rotor assembly 50 does not contact the interior of the gimbal housing 24. The brushless DC motor spins the rotor assembly 50 inside the gimbal housing 42 about the rotor axis. The gap sensors 38 and 39 constantly monitor the position of the rotor assembly in the output axis and gimbal axis directions. If the rotor assembly begins to drift towards any of the interior surfaces, the gap sensors, 38 and 39, will detect this and the output axis and gimbal axis magnetic actuators will compensate by varying the field strength. The flux sensors 41 located on all the magnetic actuators measure the strength of the magnetic field and also provide position information for the rotor.

The purpose of the control moment gyroscope is to provide directional control for a body, such as a spacecraft. It is well known in the art that if a torque is induced on a spinning rotor about an axis which is normal to the spin axis, the rotor will precess about an axis which is normal to both the spin axis of the rotor and the axis of the induced torque. As the rotor precesses, a torque will be induced on the support structure for the rotor about the axis in which the original torque was induced. This torque can then be transferred, via the support structure, to the spacecraft. A better understanding of this phenomenon may be found by studying the diagram in FIG. 5.

Figure 5:
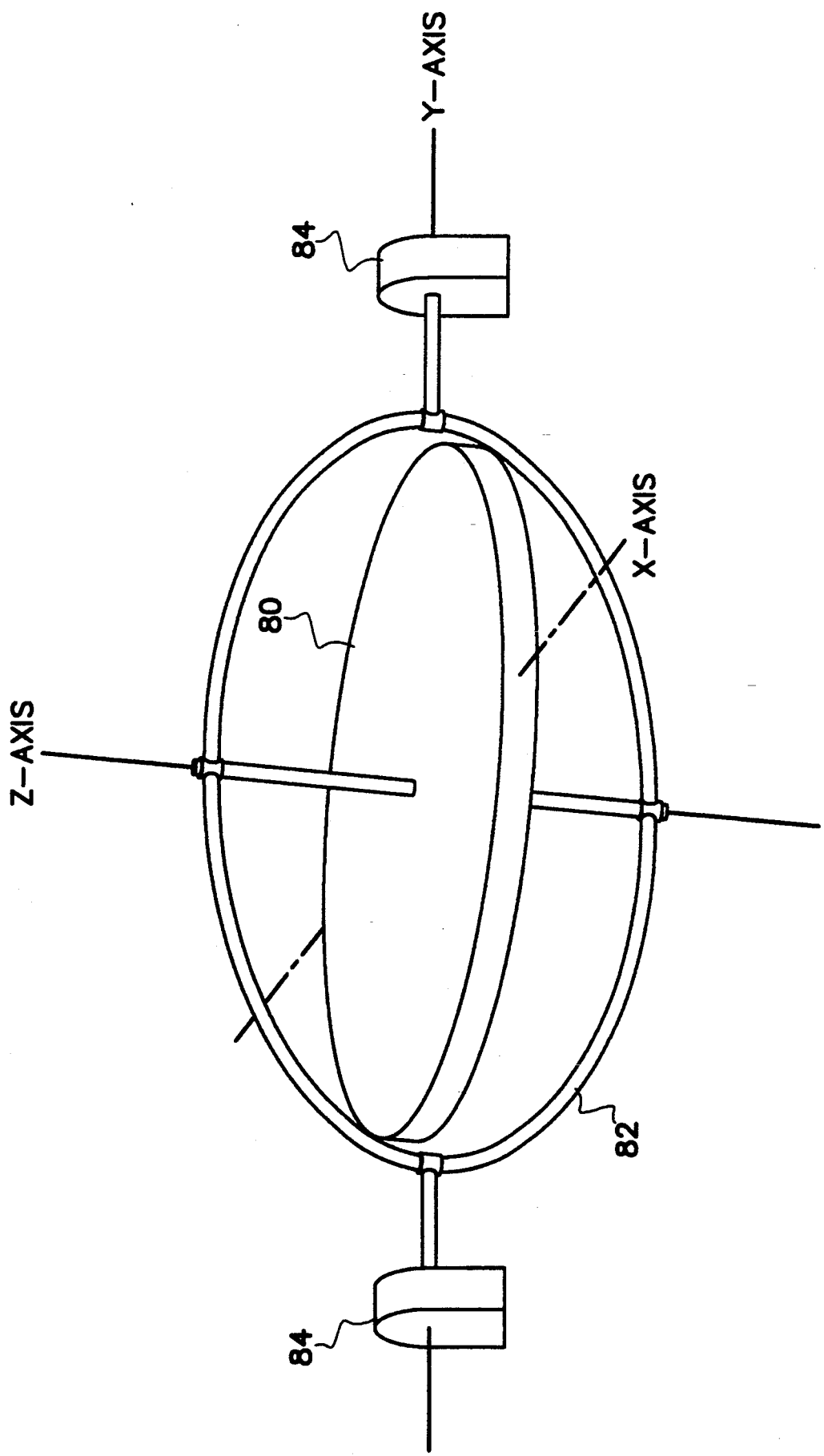
FIG. 5 is a simplified gyroscope diagram

The diagram in FIG. 5 shows a simplified diagram of a rotor 80, a gimbal 82, and a gimbal support 84. In this example, the rotor is rotating at a predetermined rate and the gimbal support is fixedly attached to some support structure, such as a spacecraft. One method of inducing a torque on the spacecraft is by rotating the gimbal and rotor about the gimbal axis. According to the laws of precession, this rotation will induce a torque which is felt about the output axis. This phenomenon is described by the equation $$T_x = \omega_y \times H_z$$

$T_x$ is the Torque in the output axis
$\omega_y$ is the Rotation rate of the rotor in gimbal axis (gimbal rate)
$H_z$ is the Angular momentum of the rotor.
Any changes in output torque are directly proportional to the gimbal rate and the rate of rotation of the rotor.

In the perfect system, the gimbal torque motor rotates at a rate which is constant and smooth, and there are no anomalies in the torque output. In the real world, no motor is without its imperfections, and anomalies which appear in the gimbal rate are then amplified by the angular momentum. The anomalies are included in the following equation:

$$T_x = (\omega_y + \delta\omega_y) \times H_z$$

$\delta\omega_y$ is the anomalous rate of the gimbal

The direct torque control moment gyroscope substantially reduces torque anomalies by using electromagnetic force actuators to induce torque on the rotor rather than a mechanical torque motor. Its operation can be better understood by referring again to the gyroscope in FIG. 5. As was described above, the typical control moment gyroscope induces a torque on a spacecraft by rotating the spinning rotor about an axis which is normal to the output axis. In the direct torque control moment gyroscope, a torque is first applied to the spinning rotor about the output axis. This induced torque will cause the spinning rotor to precess about the gimbal axis. The gimbal will rotate following the precession of the rotor. The gimbal rotation rate is directly proportional to the torque around the output axis. The gimbal rate is determined by the equation:

$$\omega_y = H_z/T_x$$

As the rotor and gimbal rotate in unison about the gimbal axis, a torque is induced about the output axis. The torque produced by the magnetic actuators reacts directly on the spacecraft about the output axis.

The control moment gyroscope assembly 10 employs the above described principles. When a spacecraft directional change is desired, the rotor assembly 50 is magnetically levitated between translational actuators. The DC brushless motor spins the rotor assembly around the rotor axis. To create the directional change, a torque is induced on the rotor assembly around the output axis by the magnetic actuators 34, 35, 46 and 47. This induced torque causes the rotor assembly 50 to precess around the gimbal axis. In order to avoid a touchdown of the rotor assembly 50 within the gimbal housing 24, the torque motor rotates the gimbal housing 24 to follow the precession of the rotor assembly. As the rotor assembly rotates a torque is induced on the spacecraft about the output axis.

Figure 6:
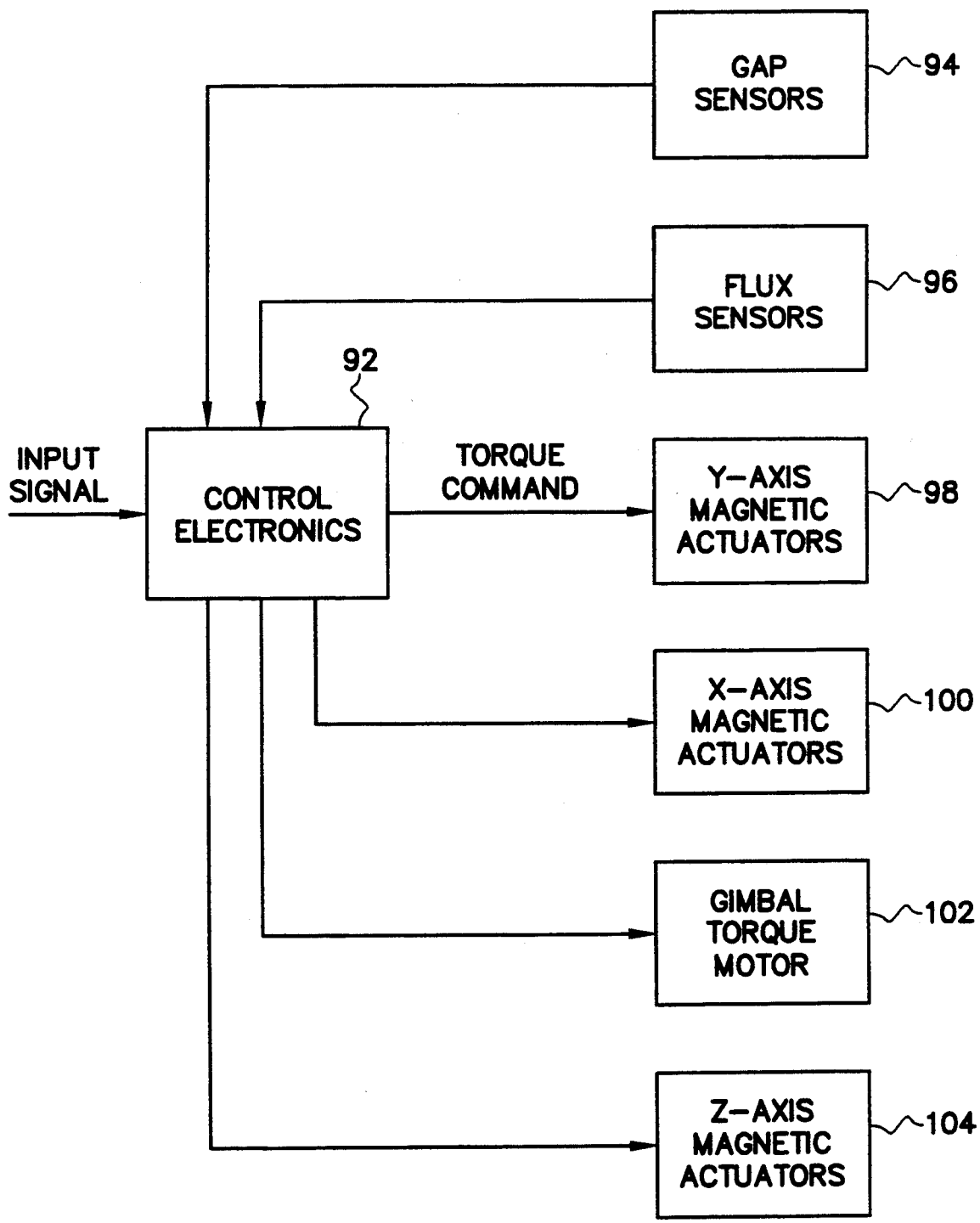
FIG. 6 is a block diagram of the control system for the gyroscope.

The control system of the control moment gyroscope can be better understood by studying the block diagram in FIG. 6. The diagram depicts the control feedback system of the direct torque control moment gyroscope. When a spacecraft directional change is desired and the rotor assembly is spinning, the control electronics 92 receives an input command. In response, the control electronics sends a torque command to the gimbal axis magnetic actuators 98. The gimbal axis actuators then intensify the magnetic field strength so as to induce a torque on the rotor assembly about the output axis. This torque causes the rotor assembly 50 to precess around the gimbal axis.

The flux sensors 96 detect the increase in field strength of the output axis actuators and transmit this information back to the control electronics 92. The gap sensors 94 also detect the precession of the rotor assembly and transmit this information to the control electronics 92. In response to the signals sent by the flux sensors 96 and gap sensors 94, the control electronics 92 will increase the field strength of the X-axis actuators 100 so that the rotor assembly does not contact the inside of the gimbal assembly. Also, the control electronics sends a signal to the gimbal torque motor 12 which then rotates the gimbal housing 24. The gimbal housing is rotated so that it closely follows the precession of the rotor assembly 50. In addition to monitoring the precession of the gyro, the different sensors will monitor the position of the rotor assembly along the Z-axis and control signals will be transmitted to the Z-axis magnetic actuators 104.

Referring again to FIG. 1, the rotation of the gimbal housing is in response to a torque which is applied about the output axis. The torque that is applied to the spacecraft is applied by an electromagnetic force actuator instead of a rate induced by a torque motor. The use of the torque motor is to simply follow the precession of the rotor so that there is not a touchdown within the gimbal housing. The use of magnetic actuator instead of a motor allows torque to be induced on the spacecraft in a smoother fashion.

The foregoing is a description of a novel and nonobvious Direct Torque Control Moment Gyroscope. The applicant does not intend to limit the invention through the foregoing description, but instead define the invention through the Claims appended hereto.

We claim:

1. A control moment gyroscope which applies directional torque to a vehicle comprising:
   a gimbal;
   gimbal support means mechanically attached to the vehicle which allows rotation of said gimbal about a gimbal axis;
   a rotor;
   means to magnetically levitate said rotor within said gimbal;
   means for inducing angular rotation of said rotor about a rotor axis which is normal to the gimbal axis;
   means for generating a magnetic field which induces torque on said rotor about an output axis normal to both the rotor axis and the gimbal axis, the torque on said rotor is transferred to the vehicle through said gimbal support means;
   sensing means to detect the proximity of said rotor to said gimbal; and
   rotation means connected to said sensing means for rotating said gimbal so as to follow precession of the rotor about the gimbal axis and avoid contact between the gimbal and said rotor.

2. The control moment gyroscope of claim 1 wherein the vehicle is a spacecraft.

3. The control moment gyroscope of claim 1 wherein said rotor is levitated within said gimbal by an electrostatic or electromagnetic field.

4. The control moment gyroscope of claim 3 wherein said means for inducing angular rotation on said rotor is a DC brushless motor.

5. The control moment gyroscope of claim 4 wherein said sensing means is a magnetic flux detector.

6. The control moment gyroscope of claim 5 wherein said sensing means is a hall element.

7. The control moment gyroscope of claim 4 wherein said sensing means is a gap sensor.

8. The control moment gyroscope of claim 7 wherein said sensing means is an eddy current sensor.

9. The control moment gyroscope of claim 3 wherein said means for generating a magnetic field is a plurality of magnetic actuators which create an electromagnetic or electrostatic field.

10. The control moment gyroscope of claim 1 wherein said gimbal torque means is an electromechanical motor.

11. A vehicle mounted control moment gyroscope comprising:
    a rotor;
    a gimbal;
    means for magnetically levitating said rotor within said gimbal;
    means for rotating said rotor about a rotor axis;
    means for generating a magnetic field which induces a torque on said rotor about an output axis which is normal to the rotor axis;
    gimbal support means mounted on the vehicle and mechanically connected to said gimbal so that said gimbal may rotate about a gimbal axis which is normal to both the rotor axis and the output axis;

a plurality of sensors for sensing the proximity of said rotor to said gimbal;

a gimbal torque motor for rotating said gimbal about the gimbal axis; and a control circuit electrically connected to said plurality of sensors and said torque motor for rotating said gimbal about the gimbal axis so as to follow precession of said rotor.

12. The control moment gyroscope of claim 11 wherein the vehicle is a spacecraft.

13. The control moment gyroscope of claim 11 wherein said means for magnetically levitating said rotor are a plurality of actuators which generate an electrostatic or electromagnetic field around said rotor.

14. The control moment gyroscope of claim 13 wherein said means for rotating said rotor is a DC brushless motor.

15. The control moment gyroscope of claim 14 wherein said sensors are magnetic flux detectors.

16. The control moment gyroscope of claim 15 wherein said sensors are hall elements.

17. The control moment gyroscope of claim 14 wherein said sensors are gap sensors.

18. The control moment gyroscope of claim 16 wherein said sensors are eddy current elements.

19. The control moment gyroscope of claim 11 wherein said means for generating a magnetic field is a plurality of magnetic actuators which create a electromagnetic or electrostatic field around said rotor.

20. The control moment gyroscope of claim 11 wherein said gimbal torque motor is an electromechanical motor.

* * * * *